United States Patent [19]

Kuehn

[11] 4,325,132

[45] Apr. 13, 1982

[54] UNITARY PHONOGRAPH CARTRIDGE AND HEAD ASSEMBLY

[75] Inventor: John P. Kuehn, Danbury, Conn.

[73] Assignee: Audio Dynamics Corporation, New Milford, Conn.

[21] Appl. No.: 127,524

[22] Filed: Mar. 5, 1980

[51] Int. Cl.³ .............................................. G11B 21/24
[52] U.S. Cl. .................................................. 369/256
[58] Field of Search ................................ 369/170, 256

[56] References Cited

U.S. PATENT DOCUMENTS

| 3,369,816 | 2/1968 | Zahner | 369/256 |
| 3,858,889 | 1/1975 | Hagenah | 369/256 |
| 3,939,495 | 2/1976 | Nagai et al. | 369/170 |

FOREIGN PATENT DOCUMENTS

| 48-60502 | 6/1973 | Japan . |
| 49-19448 | 2/1974 | Japan . |
| 50-72205 | 4/1975 | Japan . |
| 51-21765 | 2/1976 | Japan . |
| 51-27771 | 3/1976 | Japan . |
| 51-51883 | 5/1976 | Japan . |
| 51-94202 | 10/1976 | Japan . |
| 51-95302 | 10/1976 | Japan . |
| 51-101902 | 11/1976 | Japan . |
| 53-12301 | 1/1978 | Japan . |
| 53-27601 | 1/1978 | Japan . |
| 53-32702 | 2/1978 | Japan . |
| 54-79602 | 4/1979 | Japan . |

Primary Examiner—Charles E. Phillips
Attorney, Agent, or Firm—Hopgood, Calimafde, Kalil, Blaustein & Judlowe

[57] ABSTRACT

A unitary headshell and phonograph cartridge assembly in which the vertical angle and overhang dimension can both be independently adjusted, thereby to permit the cartridge assembly to be used with different heights of record player arms and to achieve minimum tracking angle distortion for the particular tone arm with which the cartridge assembly is utilized.

4 Claims, 5 Drawing Figures

UNITARY PHONOGRAPH CARTRIDGE AND HEAD ASSEMBLY

The present invention relates generally to phonograph cartridges, and more specifically to a unitary headshell-cartridge assembly.

In the design of phonograph cartridges it is generally desirable to reduce the stiffness, that is, to increase the compliance, of the cartridge, to allow the cartridge to track a phonograph record with a reduced force. However, as the compliance of a cartridge is increased, its resonant frequency decreases approximately in proportion to the square of the compliance to a level at which it approaches the resonant frequency of the turntable structure or of ambient structures at which point the cartridge will tend to vibrate and introduce noticeable and objectionable distortion.

It is accordingly a goal of cartridge designers to achieve relatively high compliance while at the same time maintaining a sufficiently high resonant frequency for the cartridge. In furtherance of this goal the cartridge designer has heretofore taken one of two courses, each of which requires a tradeoff or sacrifice in cartridge performance. The first of these approaches is to make the cartridge more stiff or less compliant, which tends to make the cartridge unable to operate at the requisite high compliance of modern, high-quality cartridges. The second of these approaches is to reduce the overall weight of the tone arm, headshell, and cartridge itself to achieve an overall reduction of mass of these components. There are, however, practical limitations as to how much reduction in mass can be achieved in these separate components, so that some compromise in cartridge and headshell design must be made to achieve the desired relatively high compliance without reducing the resonant frequency of the cartridge to a low level at which distortion would occur. Most of these design compromises, however, result in a less than optimum performance of the cartridge.

In recent years, in an attempt to obtain a lower mass arm-headshell-cartridge assembly, it has been proposed to form the cartridge into a unitary assembly with the headshell, which, in turn, is adapted to be received within an opening at the end of the tone arm. However, since all tone arms are not alike, it has heretofore not been possible to achieve the proper offset and tracking angles for the stylus for a great variety of commercially available tone arms. This, in turn, has resulted in an undesirable and sometimes unacceptable level of distortion when these cartridge assemblies were placed into some tone arms. As a result, the consumer acceptance of unitary headshell-cartridge assemblies has been limited as has been the utility of those assemblies with a wide number of different tone arms. The potential advantages of unitary cartridge-headshell assemblies is thus yet to be realized.

It is accordingly an object of this invention to provide an improved unitary headshell-cartridge assembly which provides both high compliance and low mass with vertical tracking angles that can be set so as to be compatible with a variety of phonograph tone arms.

It is a further object of the present invention to provide a cartridge assembly of the type described, which enables the user to readily achieve optimum overhang dimension and vertical tracking angles for the stylus.

It is another object of the present invention to provide a unitary head cartridge assembly of the type described which can be adjusted for use with a wide variety of tone arms to operate at low distortion.

To these ends the present invention is directed to a unitary head and cartridge assembly which contains separate adjustments for the vertical angle and for the overhang dimension, along with indicia on the assembly to enable the user to accurately and simply make the correct setting of the cartridge for a variety of different tone arms.

To the accomplishment of the above and such further objects as may hereinafter appear, the present invention relates to a unitary head-cartridge assembly as set forth in the appended claims, and as described in the following specification as considered with the accompanying drawing in which:

Figure 1:
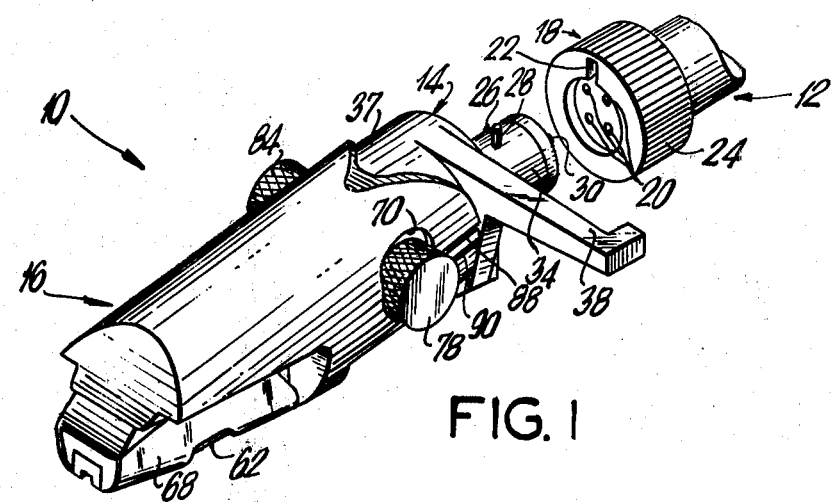
FIG. 1 is a perspective view of the unitary phonograph cartridge and head assembly of the invention shown spaced from the forward position of the tone arm.
Figure 2:
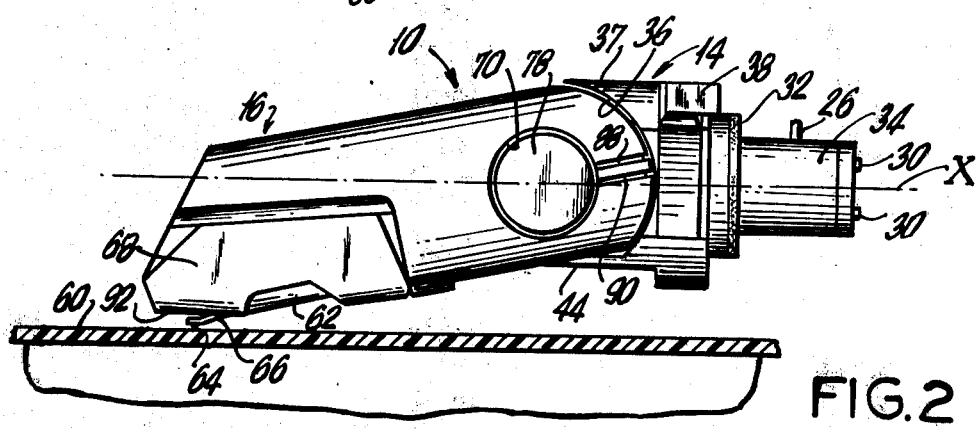
FIG. 2 is a side elevational view of the cartridge and head assembly of FIG. 1 shown in an unextended position.

The unitary head shell and phonograph cartridge assembly, according to the present invention, which is generally designated 10, is adapted to be mounted to the end of a phonograph tone arm 12. Cartridge assembly 10 includes a fixed part 14 for connection to tone arm 12 and a movable part 16 mounted for articulation on part 14. Tone arm 12 includes a universal or bayonet socket 18, which includes a series of pin-receiving sockets 20, an alignment slot 22, and a locking ring 24. Fixed part 14 includes a plug assembly 26 for insertion into socket 18 on tone arm 12. Plug assembly 26 includes an alignment pin 28 receivable within alignment slot 22 and pins 30 for insertion into pin-receiving sockets 20. When coupled, alignment pin 26 and alignment slot 22 prevent assembly 10 from rotating with respect to tone arm 12. A washer 32 (FIG. 2) disposed about cylindrical portion 34 of plug assembly 26 abuts the end of socket assembly 18 on tone arm 12.

Figure 3:
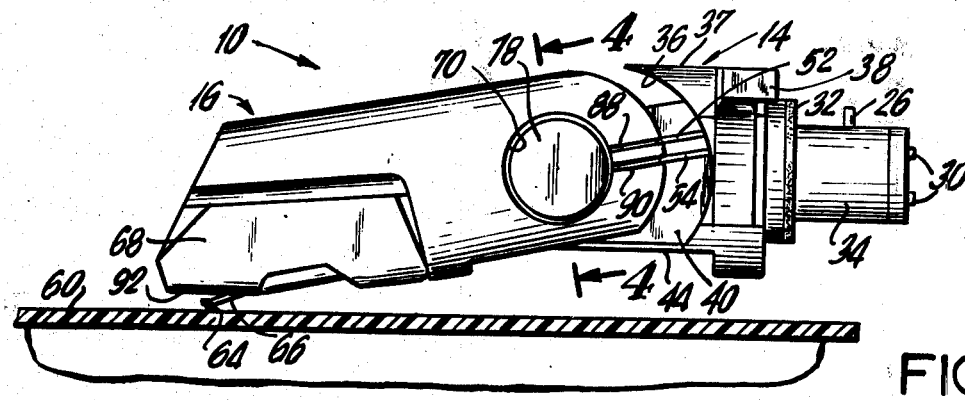
FIG. 3 is a side elevational view similar to that of FIG. 2 with the cartridge and head assembly in an extended position.
Figure 4:
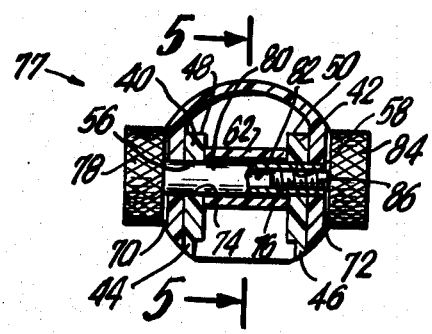
FIG. 4 is a cross-sectional view taken along line 4—4 of FIG. 3.
Figure 5:
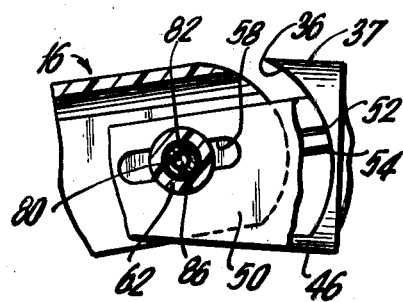
FIG. 5 is a cross-sectional view taken along line 5—5 of FIG. 4.

Fixed part 14 of assembly 10 is generally cylindrical in configuration and includes forward-facing curved, concave walls 36, 37 and a finger lift 38 extending at right angles thereto to permit the user to grasp and lift cartridge assembly 10 and tone arm 12. Arms 40 and 42 respectively extend from curved walls 36, 37, and are disposed on each side of the longitudinal centerline of assembly 10. The lower edges 44, 46 of arms 40, 42, respectively extend generally parallel to the longitudinal axis of cartridge assembly 10, and the upper edges 48, 50 of arms 40, 42, respectively extend at an angle to walls 44, 46 such that arms 40, 42 taper to a narrow part toward movable part 16. Arms 40, 42 each include spaced parallel inscribed lines 52, 54, and also respectively include elongated slots 56, 58, the longitudinal center lines of which lie between inscribed lines 52, 54. A tubular member 62 extends between arms 40, 42 and is free to move along slots 56, 58. As will be described in detail further on in this specification, lines 52, 54 form the alignment indicia which permit the user to set the vertical tracking angle of cartridge assembly 10 to assure a parallel arrangement between the stylus carrier of movable part 16 and the grooves of a record 60 (FIGS. 2 and 3) in which the stylus is placed.

Movable part 16 of cartridge assembly 10 is generally cylindrical in configuration and includes a unitary transducer 62, which may be of any known type for transducing the vibrations of a stylus 64 and its cantilever 66 into electrical signals as the stylus is vibrated by the grooves of record 60. A stylus handle 68 permits the removal of stylus 64 and cantilever arm 66 as a unit from transducer 62. Movable part 16 of assembly 10 includes a pair of recessed flat walls 70, 72 disposed on both sides of its longitudinal axis, and recessed walls 70, 72 include centrally located openings 74, 76, respectively.

Extending through openings 76, 74 is a locking assembly 77 for locking movable portion 16 with respect to fixed portion 14. A first knob 78 includes a cylindrical shaft 80 which has an internally threaded opening 82. A second knob 84 includes an externally threaded cylindrical shaft 86 for engagement with opening 82 in shaft 80. Shaft 80 extends through opening 74 in wall 70, slot 56 in wall 44, tubular member 62, slot 56 in wall 46, and opening 76 in wall 72. Thus, when knob 78 is turned with respect to knob 84 to loosen the engagement of locking assembly 77, the movable part 16 may be both pivoted with respect to, and moved along, slots 58 and 56. The rear of movable part 16 includes a pair of inscribed lines 88, 90 which form alignment indicia for use with inscribed lines 52, 54 on fixed part 14.

In order to obtain the lowest possible distortion from a phonograph cartridge, the stylus is set to a precise distance from the pivotal axis of the tone arm. This procedure is known as setting the cartridge "overhang". After the overhang is set, the stylus must then be positioned perpendicularly with respect to the record. In the cartridge assembly of the present invention as described hereinabove, the overhang of the assembly can be first set and thereafter the perpendicularity of the stylus may be adjusted. More specifically, the cartridge overhang is set by adjusting the distance between movable part 16 and the fixed part 14 by loosening locking assembly 77 and displacing movable part 16 along slots 56, 58. Overhang adjustment is accomplished by means of a guide (not shown), which is fitted over the spindle of the turntable; the user then adjusts the distance between fixed part 14 and movable part 16 of assembly 10 until the stylus is in alignment with markings on the guide.

After the cartridge overhang is set, the cartridge is then adjusted for the proper vertical tracking angle so that stylus 64 rides perpendicularly with respect to record 60. Lines 52, 54 on fixed part 14 and lines 88, 90 on movable part 16 are utilized for this purpose. When line 88 is in alignment with line 52 and when line 90 is in alignment with line 54, the bottom wall 92 of stylus holder 68 will be parallel to record 60, and thus stylus 64 will be perpendicular to record 60 when tone arm 12 is parallel to record 64. After lines 88, 90 are aligned with respect to lines 52, 54, locking assembly 77 is tightened to secure the distance and angle adjustments.

In certain applications, particularly in record players which permit multiple records to be played, one atop the other, parallelism between tone arm 12 and record 64 is not always the case. Indicia markings 52, 54 and 88, 90 also permit adjustment of the vertical tracking angle to compensate for nonparallel arms. In this instance, after first adjusting the proper overhang, fixed part 14 is positioned with respect to movable part 16 so that edge 92 of stylus holder 68 is parallel to record 60. Indicia markings 52, 54, 88, 90 will then indicate the degree of angular correction required to maintain stylus perpendicularity. For example, when lower line 90 on movable part 16 is aligned with upper line 52 on fixed part 14, stylus holder 68 will be disposed at an angle of +8° with respect to fixed part 14 and tone arm 12. Conversely, when upper line 88 on movable part 16 is aligned with lower line 54 on fixed part 14 the cartridge will be disposed at an angle of −8° with respect to tone arm 12. When the alignment markings are centered between each other the cartridge will be disposed at an angle of + or −4°. Thus, both stylus overhang and vertical tracking angle may be optimally adjusted for the lowest possible distortion and highest possible sound fidelity.

Omitted from the drawings, for the sake of clarity, are the usual flexible wires connecting transducer assembly 62 to pins 30 of plug assembly 26. These wires are of the usual type used in phonograph headshells and are well known to those skilled in the art. Fixed part 14 and movable part 16 are preferably constructed from carbon-fiber filled plastic material. This material is lightweight, anti-resonant, and due to the fact that it is somewhat electrically conductive, provides electrical field shielding of the cartridge/headshell assembly.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A unitary phonograph cartridge and headshell assembly for attachment to a tone arm, said assembly comprising:
    a fixed part adapted to be coupled to the tone arm, said fixed part including a pair of forwardly extending arms, each of said arms including an elongated slot disposed at an acute angle with respect to the longitudinal axis of said fixed part;
    indicia means disposed on said fixed part, said indicia means on said fixed part being parallel to and aligned with said elongated slot in said arm;
    a movable part movably joined to said fixed part, said movable part abutting said arms and including a pair of openings disposed proximate to said slots in said arms;
    stylus/transducer means fixedly joined to said movable part;
    indicia means disposed on said movable part, said indicia means on said movable part being aligned with said indicia means on said fixed part when said stylus/transducer means is parallel to the record to be played;
    locking means extending through said openings in said movable part and said elongated slot means in said arms, said locking means defining a pivotal axis for said movable part and permitting said movable part to slide along said elongated slot to thereby permit said movable part to be displaced both along said elongated slot and pivoted with respect to said fixed part and to facilitate the user in maintaining parallelism between said stylus/transducer means and the record to be played.

2. The assembly as claimed in claim 1, wherein at least one of said indicia means on said fixed and said movable parts comprises spaced parallel lines.

3. The assembly as claimed in claim 1, wherein said forwardly extending arms are spaced apart, and tubular means are slidably disposed between said arms and abutting said arms; said locking means extending through said tubular means so that said tubular means are longitudinally displaced along said slot as said movable part is longitudinally displaced along said slot with respect to said fixed part.

4. The assembly as claimed in claim 1, wherein said locking means include a shaft extending through said slots and said openings, said shaft including a first externally accessible knob at one end thereof, the other end of said shaft having asecond externally accessible knob means threaded thereto, the distance between said knob means being adjusted as said knob means are rotated with respect to ech other to thereby releasably lock said fixed part to said movable part.

* * * * *